(12) United States Patent
Khaykin et al.

(10) Patent No.: US 7,057,399 B2
(45) Date of Patent: Jun. 6, 2006

(54) RESOLVER CIRCUIT INCLUDING BTL AMPLIFIER

(75) Inventors: Boris L. Khaykin, West Bloomfield, MI (US); David R. Mulligan, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 42 days.

(21) Appl. No.: 10/800,534

(22) Filed: Mar. 15, 2004

(65) Prior Publication Data

US 2005/0200367 A1 Sep. 15, 2005

(51) Int. Cl.
*G01R 27/28* (2006.01)
*G01B 7/30* (2006.01)

(52) U.S. Cl. ............. 324/654; 324/207.25; 324/207.16

(58) Field of Classification Search ................ 324/654, 324/158.1, 603–605, 607, 207.25, 207.19; 318/661, 605
See application file for complete search history.

(56) References Cited

U.S. PATENT DOCUMENTS

| | | | | |
|---|---|---|---|---|
| 4,455,514 A | * | 6/1984 | Ohno | 318/254 |
| 4,682,090 A | * | 7/1987 | Schmidt et al. | 318/661 |
| 5,023,528 A | | 6/1991 | Saidin et al. | 318/254 |
| 5,304,909 A | * | 4/1994 | Jin et al. | 318/661 |
| 5,637,998 A | * | 6/1997 | Kushihara | 324/207.25 |
| 6,272,410 B1 | | 8/2001 | Okanoue et al. | 701/42 |
| 6,554,303 B1 | | 4/2003 | Benz et al. | 280/93.5 |
| 6,754,610 B1 | * | 6/2004 | Dudler et al. | 702/151 |
| 2001/0002631 A1 | | 6/2001 | Okanoue et al. | 180/446 |
| 2002/0143450 A1 | | 10/2002 | Fujimoto et al. | 701/43 |
| 2002/0152039 A1 | | 10/2002 | Fujimoto et al. | 702/36 |
| 2002/0166716 A1 | | 11/2002 | Shimizu et al. | 180/446 |
| 2003/0001564 A1 | * | 1/2003 | Hayashi | 324/207.12 |
| 2005/0046551 A1 | * | 3/2005 | Cranfill et al. | 340/407.1 |

FOREIGN PATENT DOCUMENTS

WO WO 98/26973 6/1998 ................. 318/661

* cited by examiner

*Primary Examiner*—Anjan Deb
(74) *Attorney, Agent, or Firm*—Brinks Hofer Gilson & Lione

(57) ABSTRACT

A resolver circuit including a signal generation circuit, a bridge tied load amplifier, a resolver, and a resolver processing circuit is provided. The signal generation circuit is configured to generate an excitation signal for driving the resolver. The bridge tied load amplifier, having an input in electrical communication with the signal generation circuit, is configured to amplify the excitation signal. The resolver has an excitation winding and an output winding, with the excitation winding being in electrical communication with the bridge tied load amplifier. The resolver processing circuit is electrical communication with the output winding of the resolver to determine the angle of rotor of the resolver.

12 Claims, 1 Drawing Sheet

RESOLVER CIRCUIT INCLUDING BTL AMPLIFIER

BACKGROUND

1. Field of the Invention

The present invention generally relates to a resolver circuit utilizing a bridge tied load (BTL) amplifier.

2. Description of Related Art

Resolver circuits are well known for many automotive applications. One such application includes electric power assisted steering (EPAS). EPAS systems employ a brushless motor to provide variable steering assist. An inductive sine-cosine resolver is used to provide the motor position and motor speed to a system microprocessor. The resolver is a transformer with a stationary portion called the stator and a rotating core called a rotor. The contour of the rotor forms a specially curved air gap between the stator and the rotor. The varying of the air gap changes the permeance of the resolver as a sinusoidal wave corresponding to the position or angle of the rotor shaft. During rotation, an excitation signal is provided to an excitation winding in the stator causing the voltage of the output windings to change in proportion to the angle of the rotor shaft. A processing circuit then analyzes the voltage changes to determine the rotor position and speed.

Known resolver circuits are generally complex requiring many parts to provide the excitation signal with the specified amplitude and a high accuracy over a wide range of battery voltages. In view of the above, is apparent that there exists a need for an improved resolver circuit having reduced complexity while maintaining performance specifications.

SUMMARY

In satisfying the above need, as well as overcoming the enumerated drawbacks and other limitations of the related art, the present invention provides a resolver circuit including a signal generation circuit, a bridge tied load amplifier, a resolver, and a resolver processing circuit.

The signal generation circuit is configured to generate an excitation signal for driving the resolver. Having an input in electrical communication with the signal generation circuit, the bridge tied load amplifier is configured to amplify the excitation signal. An excitation winding of the resolver is in electrical communication with the bridge tied load amplifier, while the output windings of the resolver are in electrical communication with the resolver processing circuit to determine the angle of the rotor.

In another aspect of the present invention, the bridge tied load amplifier has a positive output and a negative output, where the positive output is connected to one side of the excitation winding and the negative output is connected to the other side of excitation winding.

In another aspect of the present invention, a low pass filter is connected between the signal generation circuit and the bridge tied load amplifier. The low pass filter includes a resistive load in electrical series with the bridge tied load amplifier and a capacitive load electrically parallel with the bridge tied load amplifier.

In yet another aspect of the present invention, a bridge tied load amplifier includes a first linear amplifier and a second linear amplifier. The first and second linear amplifiers have an offset voltage at half the supply voltage. Further, the second linear amplifier has an inverted output in communication with the negative output of the bridge tied load amplifier.

Further objects, features in advantages of this invention will become readily apparent to a person skilled in the art after a review of the following description, with reference to drawings and claims that are appended to and form part of the specification.

DETAILED DESCRIPTION

Figure 1:
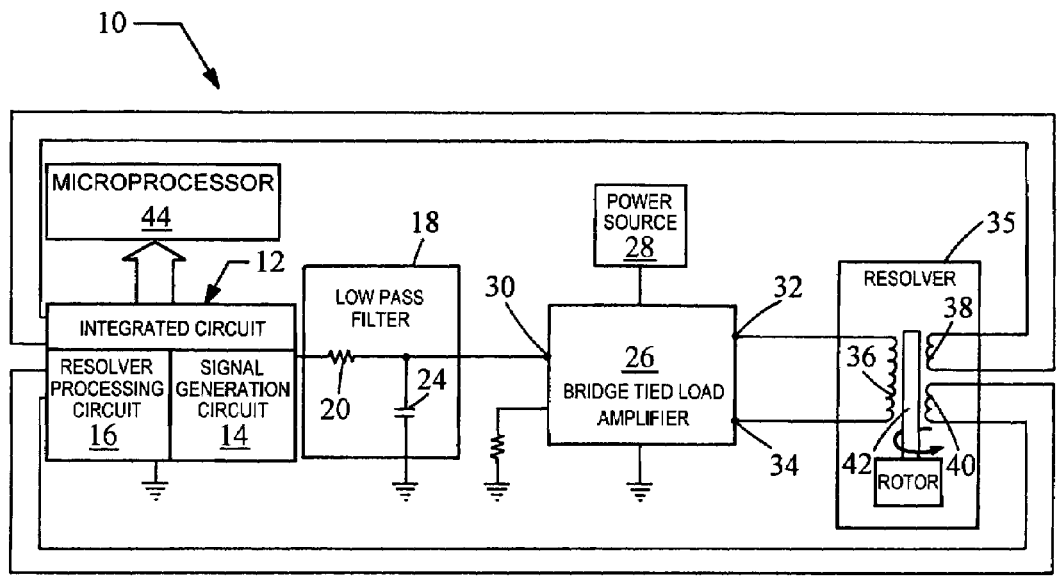
FIG. 1 is a schematic view of an embodiment of a resolver circuit having a bridge tied load amplifier in accordance with the present invention.

Referring now to FIG. 1, a resolver circuit embodying the principles of the present invention is illustrated therein and designated at 10. The resolver circuit 10 includes a signal generation circuit 14, bridge tied load amplifier 26, a resolver 35, and resolver processing circuit 16.

The signal generation circuit 14 is included in an integrated circuit 12 and configured to generate an excitation signal to drive the resolver 35. Preferably, the excitation signal is a sinusoidal waveform having a frequency of about 10 kHz. The excitation signal is provided to a low pass filter 18 to remove high frequency components in excitation signal. The low pass filter 18 includes a resistive load 20 in electrical series with the bridge tied load amplifier 26 and a capacitive load 24 connected electrically parallel to the bridge tied load amplifier 26. After filtering, the excitation signal is received by the input 30 of the bridge tied load amplifier 26. The bridge tied load amplifier 26 is powered by a power source 28, which in automotive applications is typically the vehicle battery. The bridge tied load amplifier 26 amplifies the excitation signal, providing enough current flow to drive the resolver 35. As shown, the bridge tied load amplifier 26 provides a fixed gain, although other variable gain scenarios are contemplated. Preferably, the amplified excitation signal is a 10 kHz sinusoidal voltage of up to 20 volts p—p.

The resolver 35 has excitation winding 36 located in the stator. The excitation winding 36 of the resolver 35 receives the amplified excitation signal from the positive output 32 and negative output 34 of the bridge tied amplifier 26. As illustrated, one side of the excitation winding 36 positive output 32 of the bridge tied load amplifier 26 and the negative output 34 is connected to the other side of the excitation winding 36.

Further, the resolver 35 includes a first output winding 38 and a second output winding 40 contained in the stator and configured to generate a voltage as the rotor 42 rotates. The contour of the rotor 42 forms a specially curved air gap between the stator and the rotor 42. As the rotor 42 rotates, the change of air gap between the rotor 42 and stator generates varying output voltages in the first and second output windings 38 and 40 that change in proportion to the sine and cosine, respectively, of the angle of the rotor 42.

The resolver processing circuit 16, mentioned briefly above as part of the integrated circuit 12, receives a first differential signal from the first output winding 38 and a second differential signal from the second output winding 40. Based on these first and second differential signals, the resolver processing circuit 16 generates motor position information, such as a 10 bit digital position signal. The motor position information is then provided to a microprocessor 44 for further use within the EPAS and other vehicle systems.

As seen above, the resolver circuit 10 requires only three external parts, and this allows for a reduction in the number of components and printed circuit board space, over known designs. Further, the resolver circuit 10 provides for internal thermal shutdown and short-circuit protection, while providing improved crossover distortion and gain variation.

Figure 2:
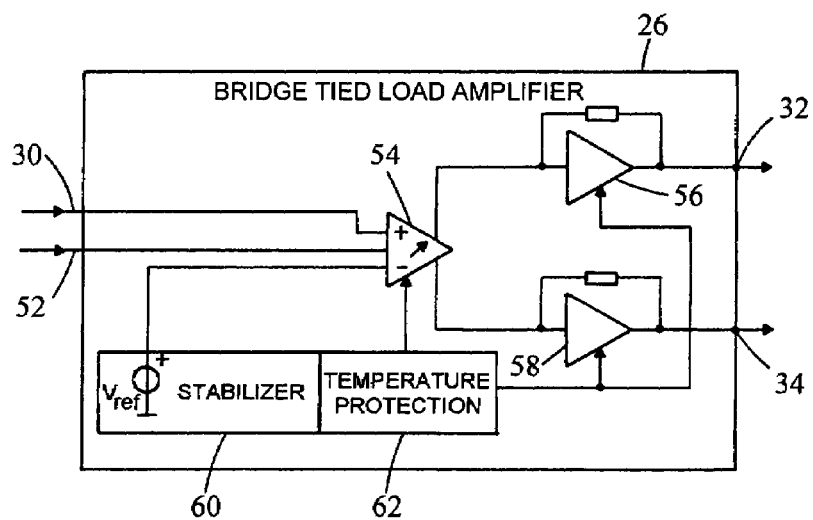
FIG. 2 is a schematic view of an embodiment of a bridge tied load amplifier for use in a resolver circuit in accordance with the present invention.

Now referring to FIG. 2, a schematic of an embodiment of the bridge tied load amplifier 26 is provided. The filtered excitation signal is received from the low-pass filter 18 at the input 30 of the bridge tied load amplifier 26. A first amplifier 54 receives the filtered excitation signal from the input 30 and a reference voltage from a voltage stabilizer 60. Optionally, a gain input 52 may be used to adjust the gain generated by the bridge tied load amplifier 26. Amplifier 54 is in electrical communication with a first linear amplifier 56 and a second linear amplifier 58. The first and second linear amplifiers 56 and 58 have an offset voltage at one half of the supply voltage. Further, the second linear amplifier 58 has an inverted output. The first linear amplifier is in electrical communication with the positive output 32 of the bridge tied amplifier 26, while the second linear amplifier 58 is in electrical communication with the negative output 34 of the bridge tied amplifier 26. When a load is place between the positive and negative outputs 32 and 34, the bridge tied amplifier is no longer ground referenced, and the peak to peak voltage across the load can be doubled from that which would be available to a ground referenced load. The bridge tied load amplifier 26, as shown, also allows for bidirectional current flow through the load, while utilizing a unipolar voltage supply.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A resolver circuit comprising:
   a signal generation circuit configured to generate an excitation signal;
   a bridge tied load amplifier, having an input in electrical communication with the signal generation circuit;
   a resolver having an excitation winding in electrical communication with the bridge tied load amplifier;
   a resolver processing circuit in electrical communication with a first output winding of the resolver.

2. The resolver circuit according to claim 1, wherein the bridge tied load amplifier has a positive output and a negative output, the positive output being connected to one side of the excitation winding, the negative side being connected to the opposite side of the excitation winding.

3. The resolver circuit according to claim 1, wherein the signal generation circuit is configured to generate a sinewave excitation signal.

4. The resolver circuit according to claim 1, wherein the signal generation circuit is configured to generate an excitation signal of about 10 kHz.

5. The resolver circuit according to claim 1, further comprising a low pass filter connected between the signal generation circuit and the bridge tied load amplifier.

6. The resolver circuit according to claim 5, wherein the low pass filter includes a resistive load in electrical series with the bridge tied load amplifier and a capacitive load electrically parallel with the bridge tied load amplifier.

7. The resolver circuit according to claim 1, wherein the resolver includes a second output winding in electrical communication with the resolver processing circuit.

8. The resolver circuit according to claim 1, wherein the signal generation circuit and the resolver processing circuit form portions of a single integrated circuit device.

9. The resolver circuit according to claim 1, wherein the bridge tied load amplifier includes a first linear amplifier and a second linear amplifier.

10. The resolver circuit according to claim 1, wherein the bridge tied load amplifier includes a first and second amplifier, the second amplifier having an inverted output with respect to the first amplifier.

11. A resolver circuit comprising:
    a signal generation circuit configured to generate an excitation signal;
    a bridge tied load amplifier having an input in electrical communication with the signal generation circuit:
    a resolver having an excitation winding in electrical communication with the bridge tied load amplifier; and
    a resolver processing circuit in electrical communication with a first output winding of the resolver, wherein the bridge tied load amplifier includes a first linear amplifier and a second linear amplifier, the first and second linear amplifiers have having an output offset voltage at half the supply voltage.

12. A resolver circuit comprising:
    a signal generation circuit configured to generate an excitation signal;
    a bridge tied load amplifier having an input in electrical communication with the signal generation circuit;
    a resolver having an excitation winding in electrical communication with the bridge tied load amplifier; and
    a resolver processing circuit in electrical communication with a first output winding of the resolver, wherein the bridge tied load amplifier includes a first linear amplifier and a second linear amplifier, the second linear amplifier having an inverted output in communication with a negative output of the bridge tied load amplifier.

* * * * *